(12) United States Patent
Li et al.

(10) Patent No.: US 11,492,263 B2
(45) Date of Patent: Nov. 8, 2022

(54) METHOD OF PREPARING INORGANIC MACROMOLECULAR FLOCCULANT BY POLYMERIZING SILICATE AND ZIRCONIUM CHLORIDE

(71) Applicant: Beijing University of Technology, Beijing (CN)

(72) Inventors: Xing Li, Beijing (CN); Zhaoyang Su, Beijing (CN); Yanling Yang, Beijing (CN); Peng Du, Beijing (CN)

(73) Assignee: Beijing University of Technology, Beijing (CN)

( * ) Notice: Subject to any disclaimer, the term of this patent is extended or adjusted under 35 U.S.C. 154(b) by 996 days.

(21) Appl. No.: 16/310,460

(22) PCT Filed: Dec. 26, 2017

(86) PCT No.: PCT/CN2017/118444
§ 371 (c)(1),
(2) Date: Dec. 17, 2018

(87) PCT Pub. No.: WO2019/119476
PCT Pub. Date: Jun. 27, 2019

(65) Prior Publication Data
US 2021/0032114 A1 Feb. 4, 2021

(30) Foreign Application Priority Data
Dec. 21, 2017 (CN) .......................... 201711390381.9

(51) Int. Cl.
*C01B 33/12* (2006.01)
*C01G 25/04* (2006.01)
*C02F 1/52* (2006.01)

(52) U.S. Cl.
CPC ............ *C01B 33/122* (2013.01); *C01G 25/04* (2013.01); *C02F 1/5236* (2013.01)

(58) Field of Classification Search
CPC .... C08K 3/34; C08K 3/36; C08K 2003/2244; C08K 3/20; C08K 3/22; C02F 1/52; C02F 1/5236; C01B 33/122
See application file for complete search history.

(56) References Cited

U.S. PATENT DOCUMENTS
2010/0330366 A1   12/2010   Keiser et al.

FOREIGN PATENT DOCUMENTS
| CN | 1082006 A |   | 2/1994 |
| CN | 103342406 A | * | 10/2013 |
| CN | 104004581 A |   | 8/2014 |
| CN | 107151030 A | * | 9/2017 |

OTHER PUBLICATIONS

Machine translation of CN 107151030 A originally published Sep. 2017 to Hu et al. (Year: 2017).*
Machine translation of CN 103342406 A originally published Oct. 2013 to Gao et al. (Year: 2013).*

\* cited by examiner

*Primary Examiner* — Stefanie J Cohen
*Assistant Examiner* — Ritu S Shirali
(74) *Attorney, Agent, or Firm* — Leonid Kisselev

(57) ABSTRACT

A method for preparing inorganic macromolecular flocculant by polymerizing silicate and zirconium tetrachloride is disclosed and relates to the field of feed water treatment. The invention aims at the problem of poor efficiency of inorganic low-molecular zirconium salt flocculant in treating low-temperature raw water and blockage of flocculation, by copolymerization of polymeric zirconium chloride and polysilicic acid, the Si—O—Zr bond was formed to increase the molecular chain of the flocculant to strengthen the function of adsorption bridge and net capture sweep. Under low temperature, the flocculant can remove organic pollutants effectively, and the size of flocs formed is large and easy to precipitate. The invention is particularly suitable for the treatment of raw water at low temperature, low turbidity and high organics by enhanced coagulation.

4 Claims, No Drawings

METHOD OF PREPARING INORGANIC MACROMOLECULAR FLOCCULANT BY POLYMERIZING SILICATE AND ZIRCONIUM CHLORIDE

CROSS REFERENCE TO RELATED APPLICATION

This application is a national stage application of International application number PCT/CN2017/118444, filed Dec. 26, 2017, titled "A Method of Preparing Inorganic Macromolecular Flocculant by Polymerizing Silicate and Zirconium Tetrachloride" which claims the priority benefit of Chinese Patent Application No. 201711390381.9, filed on Dec. 21, 2017, which is hereby incorporated by reference in its entirety.

TECHNICAL FIELD

This invention relates in general to the field of water treatment, and in particular, to a method for preparing inorganic macromolecular flocculant by polymerizing silicate and zirconium tetrachloride.

BACKGROUND

Coagulation is an important unit in water treatment process. Aluminum and ferric salts have been playing important roles in water treatment as conventional flocculants in the past 100 years of engineering applications. However, with the development of modern technology and medicine, some deficiencies of aluminum salt and ferric salt flocculant in the water treatment plant have been gradually exposed. For example, aluminum salt has toxicity and poor performance in turbidity removal at low temperature; ferric salts is the corrosive and makes effluent yellow. Therefore, the development of new and efficient flocculant has been a goal widely shared in the industry. In recent years, the related research focuses mainly on the development and utilization of titanium salt flocculant, and many progresses were made. In addition, the development of zirconium salt flocculant has started to attract more attention.

Compared with conventional flocculant such as aluminum and ferric flocculants, zirconium salt flocculant can significantly improve the removal efficiency of organics and the size of flocs formed is larger, the structure is denser and sedimentation property is enhanced. In particular, zirconium salt flocculant can form large and dense flocculant in organic raw water (lacking particulate matter); in contrast, the flocs formed by aluminum salt and ferric salt under these water conditions are small, loose and difficult to precipitate or settle or form sedimentation. However, the formation of the zirconium salt flocculant (especially the inorganic low-molecular zirconium salt) is hindered at low temperature, as a result, pollutant removal efficiency of zirconium salt flocculant at low temperature is worse than that of aluminum salt and ferric salt flocculant.

Therefore, the preparation of high efficiency zirconium salt flocculant which can form large and dense flocculant under low temperature is a technical challenge for further development in the field of water treatment. For this reason, the inventor disclosed a method for synthesizing inorganic macromolecular polysilicic acid and poly-zirconium chloride flocculant, to overcome the disadvantages of poor removal of pollutants at low temperature by inorganic low-molecular zirconium salt.

SUMMARY

Aiming at the problem of poor performance of inorganic low-molecule weight zirconium salt flocculant on pollutant removal at low temperature, the present invention provides a preparation method of macromolecular zirconium salt flocculant suitable for low temperature conditions, especially a preparation method of inorganic macromolecular polysilicic acid and poly-zirconium chloride flocculant.

The technical principle of the invention is as follows: by adding a polysilicic acid solution into a poly-zirconium chloride solution, the poly-zirconium chloride interacts with polysilicic acid to form Si—O—Zr bonds that increase the molecular chain growth of the flocculant, overcoming the defect of inorganic low-molecular weight zirconium salt being blocked from forming flocs at low temperature, strengthening adsorption bridging and net capture sweeping effect. The flocs have a larger size and better performance for removing pollutants.

In order to achieve the above purpose, the invention provides a preparation method of inorganic macromolecular polysilicic acid and poly-zirconium chloride flocculant, comprising the following steps:

(1) weighing the starting materials and preparing solutions of the starting materials;

(2) adding the sodium silicate solution to 0.2~0.3 mol/L sulfuric acid solution dropwise, continuously stirring at 500~600 rpm at 20~25° C., maintaining pH under 2 for the mixture, curing by resting for 3~4 hours to yield a polysilicic acid solution;

(3) adding the sodium hydroxide solution to the zirconium tetrachloride solution dropwise, continuously stirring at 500~600 rpm at 20~25° C. until the mixture becomes colorless and transparent, curing by resting for 3~4 hours to yield a poly-zirconium chloride solution with alkalization degree (B) of 0.5~2.0;

(4) measuring out appropriate amount of the polysilicic acid solution at a level that keeps molar ratio of Zirconium/Silicon in the range of 5~20, adding the polysilicic acid solution dropwise to the poly-zirconium chloride solution under continuous stirring at 500~600 rpm at 20~25° C., continuing to stir at 500~600 rpm at 20~25° C. for 5~6 hours, curing by resting for 20~24 hours to yield the inorganic macromolecular polysilicic acid and poly-zirconium chloride flocculant.

In the above described method, the concentration of the polysilicic acid solution in step (2) is 0.08~0.12 mol/L as measured by Silicon.

In the above described method, the concentration of the poly-zirconium chloride solution in step (3) is 0.2~0.3 mol/L as measured by Zirconium.

In the above described method, the molar ratio of Zirconium/Silicon is 5~10:1 when the temperature of treated water is under 5° C., and 10~20:1 when the temperature of treated water is between 5° C.~10° C.

The advantages of the present invention include the following:

At low temperature, the inorganic macromolecular polysilicic acid and poly-zirconium chloride flocculant can remove organics effectively, is larger and dense, with good sedimentation property.

The inorganic macromolecular polysilicic acid and poly-zirconium chloride flocculant is stable and can be stored for 1~2 months.

The operation method is simple and easy to operate, starting material is easy to get, the cost is low, and prospect of practical application is high.

DETAILED DESCRIPTION OF THE PREFERRED EMBODIMENTS

Embodiment I

Water from a river in Beijing was taken as raw water for testing. The turbidity of the raw water was 21.8 NTU, Dissolved Organic Carbon (DOC) was 12.3 mg/L, pH was 7.3, and water temperature was 8.8° C.

The flocculant prepared by the method of the invention was used to perform coagulation test on the river water, the process being: the flocculant was added at the beginning of the coagulation test with rapid stirring at 500 RPM for 1 minute, followed by stirring at a slow rate of 50 RPM for 15 minutes, and water quality was measured after 15 minutes of static precipitation.

When the temperature of treated water is within 5~10° C., the molar ratio of Zirconium/Silicon was selected at 10~20:1 for preparing inorganic macromolecular polysilicic acid and poly-zirconium chloride flocculant, the specific preparation process is as follows:

(1) Weigh 7.4039 g solid $Na_2SiO_3 \cdot 9H_2O$ and dissolve it in 50 mL deionized water and add into 0.2 mol/L dilute sulfuric acid solution drop by drop via an injection pump at the rate of 0.1 ml/min accompanied with continuous stirring at 550 rpm and 25° C., the pH value of the mixture during the reaction process is controlled at 1.5 by 0.6 mol/L dilute sulphuric acid, cure by resting for 3 hours, 0.1 mol/L polysilicic acid solution was obtained in a volumetric flask with a capacity of 250 mL;

(2) Using an injection pump to add 50 ml 0.4 mol/L NaOH solution into 50 ml 0.4 mol/L zirconium tetrachloride solution drop by drop at the rate of 0.1 mL/min, the process was carried out at 25° C. with continuous stirring at 550 rpm until the solution was colorless and transparent, cure by resting for 3 hours, 0.2 mol/L poly-zirconium chloride solution with alkalinity (B) of 1.0 was obtained;

(3) Using an injection pump to add 20 ml the 0.1 mol/L polysilicic acid solution into 100 ml 0.2 mol/L poly-zirconium chloride solution drop by drop at the rate of 0.05 mL/min, the process was carried out at 25° C. with continuous stirring at 550 rpm, continue stirring at 550 rpm at 25° C. for 6 hours after the titration, cure by resting for 20 hours, and collect the inorganic macromolecular polysilicic acid and poly-zirconium chloride flocculant with 10:1 molar ratio of Zirconium/Silicon.

The test results are shown in Table I:

| Reagent | Dosage (In zirconium, mM) | Turbidity of precipitated water (NTU) | Precipitated water DOC (mg/L) |
|---|---|---|---|
| Zirconium tetrachloride | 0.8 | 1.6 | 2.7 |
| Polymerizing silicate and zirconium chloride | 0.5 | 1.8 | 2.2 |

Compared to using zirconium tetrachloride alone, the inorganic macromolecular polysilicic acid and poly-zirconium chloride flocculant with 10:1 molar ratio of Zirconium/Silicon exhibited the comparable removal rate for turbidity and organics, despite a 37.5% reduction in input (in zirconium), the method disclosed in this application is proven to be effective in the treatment of low temperature raw water.

Embodiment II

Water from a lake in a park in Beijing was taken on a November as raw water for testing. The turbidity of the raw water was 6.6 NTU, DOC was 6.3 mg/L, pH was 7.5, and water temperature was 3.2° C.

The flocculant prepared by the method of the invention was used to perform coagulation test on the river water, the process being: the flocculant was added at the beginning of the coagulation test with rapid stirring at 500 RPM for 1 minute, followed by stirring at a slow rate of 50 RPM for 15 minutes, and water quality was measured after 15 minutes of static precipitation.

When the temperature of treated water is within <5° C., the molar ratio of Zirconium/Silicon was selected at 5~10:1 for preparing the inorganic macromolecular polysilicic acid and poly-zirconium chloride flocculant, the specific preparation process is as follows:

(1) Weigh 7.4039 g solid $Na_2SiO_3 \cdot 9H_2O$ and dissolve it in 50 mL deionized water and add into 0.2 mol/L dilute sulfuric acid solution drop by drop via an injection pump at the rate of 0.1 ml/min accompanied with continuous stirring at 550 rpm and 25° C., the pH value of the mixture during the reaction process is controlled at 1.5 by 0.6 mol/L dilute sulphuric acid, cure by resting for 3.5 hours, 0.1 mol/L polysilicic acid solution was obtained in a volumetric flask with a capacity of 250 mL;

(2) Using an injection pump to add 50 ml 0.4 mol/L NaOH solution into 50 ml 0.4 mol/L zirconium tetrachloride solution drop by drop at the rate of 0.1 mL/min, the process was carried out at 25° C. with continuous stirring at 600 rpm until the solution was colorless and transparent, cure by resting for 3.5 hours, 0.2 mol/L poly-zirconium chloride solution with alkalinity (B) of 1.0 was obtained;

(3) Using an injection pump to add 40 ml the 0.1 mol/L polysilicic acid solution into 100 ml 0.2 mol/L poly-zirconium chloride solution drop by drop at the rate of 0.05 mL/min, the process was carried out at 25° C. with continuous stirring at 600 rpm, continue stirring at 600 rpm at 25° C. for 5 hours after the titration, cure by resting for 24 hours, and collect the inorganic macromolecular polysilicic acid and poly-zirconium chloride flocculant with 5:1 molar ratio of Zirconium/Silicon.

The test results are shown in Table II:

| Reagent | Dosage (In zirconium, mM) | Turbidity of precipitated water (NTU) | Precipitated water DOC (mg/L) |
|---|---|---|---|
| Zirconium tetrachloride | 0.5 | 2.7 | 1.9 |
| Polymerizing silicate and zirconium chloride | 0.5 | 0.9 | 0.5 |

Compared to using zirconium tetrachloride alone, the inorganic macromolecular polysilicic acid and poly-zirconium chloride flocculant with 5:1 molar ratio of Zirconium/Silicon exhibited significantly higher removal rate for turbidity and organics, when the raw water is at <5° C. The method disclosed in this application is proven to be effective in the treatment of low temperature raw water.

What is claimed is:

1. A method for preparing an inorganic macromolecular polysilicic acid and poly-zirconium chloride flocculant, wherein starting materials used for the preparation comprises sodium silicate, zirconium tetrachloride, sodium hydroxide, and sulfuric acid, comprising the steps of:

(1) weighing the starting materials and preparing solutions of each of the starting materials;

(2) adding the sodium silicate solution to 0.2~0.3 mol/L sulfuric acid solution dropwise, continuously stirring at 500~600 rpm at 20~25° C., maintaining pH under 2 for the mixture of the sodium silicate solution and sulfuric acid solution, curing by resting for 3~4 hours to yield a polysilicic acid solution;

(3) adding the sodium hydroxide solution to the zirconium tetrachloride solution dropwise, continuously stirring at 500~600 rpm at 20-25° C. until the mixture of the sodium hydroxide solution and the zirconium tetrachloride solution becomes colorless and transparent, curing by resting for 3~4 hours to yield a poly-zirconium chloride solution with alkalization degree (B) of 0.5~2.0;

(4) measuring out appropriate amount of the polysilicic acid solution at a level that keeps molar ratio of zirconium/silicon in a range of 5~20, adding the polysilicic acid solution dropwise to the poly-zirconium chloride solution under continuous stirring at 500~600 rpm at 20~25° C., continuing to stir at 500~600 rpm at 20~25° C. for 5~6 hours, curing by resting for 20~24 hours to yield the inorganic macromolecular polysilicic acid and poly-zirconium chloride flocculant.

2. The method for preparing the inorganic macromolecular polysilicic acid and poly-zirconium chloride flocculant according to claim 1, wherein a concentration of the polysilicic acid solution in step (2) is 0.08~0.12 mol/L.

3. The method for preparing the inorganic macromolecular polysilicic acid and poly-zirconium chloride flocculant according to claim 1, wherein a concentration of the poly-zirconium chloride solution in step (3) is 0.2~0.3 mol/L.

4. The method for preparing the inorganic macromolecular polysilicic acid and poly-zirconium chloride flocculant according to claim 1, wherein the molar ratio of zirconium/silicon is 5~10:1 when a temperature of treated water is under 5° C., and 10~20:1 when the temperature of treated water is between 5° C.~10° C.

* * * * *